(12) United States Patent
Büttner et al.

(10) Patent No.: US 8,531,942 B2
(45) Date of Patent: Sep. 10, 2013

(54) COMMUNICATION SYSTEM HAVING A MASTER/SLAVE STRUCTURE

(75) Inventors: Holger Büttner, Berlin (DE); Karl Weber, Altdorf (DE)

(73) Assignee: Beckhoff Automation GmbH, Verl (DE)

( * ) Notice: Subject to any disclaimer, the term of this patent is extended or adjusted under 35 U.S.C. 154(b) by 810 days.

(21) Appl. No.: 12/468,993

(22) Filed: May 20, 2009

(65) Prior Publication Data

US 2009/0235001 A1    Sep. 17, 2009

Related U.S. Application Data

(63) Continuation of application No. PCT/EP2007/062831, filed on Nov. 26, 2007.

(30) Foreign Application Priority Data

Nov. 27, 2006    (DE) .......................... 10 2006 055 889

(51) Int. Cl.
  *H04J 1/16*    (2006.01)
  *H04L 12/437*    (2006.01)

(52) U.S. Cl.
  CPC .................................. *H04L 12/437* (2013.01)
  USPC ........... 370/224; 370/216; 370/217; 370/225; 370/431; 370/433; 370/460; 710/100; 710/305

(58) Field of Classification Search
  None
  See application file for complete search history.

(56) References Cited

U.S. PATENT DOCUMENTS

| | | | |
|---|---|---|---|
| 3,652,798 A | 3/1972 | McNeilly et al. | |
| 4,530,085 A | 7/1985 | Hamada et al. | |
| 4,538,026 A | 8/1985 | Yasue | |
| 4,542,496 A | 9/1985 | Takeyama et al. | |
| 4,553,233 A | 11/1985 | Debuysscher et al. | |
| 4,573,044 A | 2/1986 | McConachie et al. | |
| 4,575,843 A | 3/1986 | David et al. | |
| 4,663,748 A | 5/1987 | Karbowiak et al. | |
| 5,081,452 A | 1/1992 | Cozic | |
| 5,623,482 A * | 4/1997 | Okanoue | 370/224 |
| 6,104,723 A | 8/2000 | Martinson et al. | |
| 6,233,704 B1 | 5/2001 | Scott et al. | |
| 6,574,192 B1 | 6/2003 | Egnell | |
| 2003/0005368 A1 | 1/2003 | Beer et al. | |
| 2004/0008719 A1 * | 1/2004 | Ying | 370/460 |
| 2004/0008720 A1 | 1/2004 | Wang et al. | |

(Continued)

FOREIGN PATENT DOCUMENTS

| | | |
|---|---|---|
| DE | 19745021 | 4/1998 |
| DE | 198 15 097 | 10/1999 |

(Continued)

OTHER PUBLICATIONS

Translation of Japanese Office Action issued on May 24, 2011 in connection with Japanese Patent Application No. 2009-537657. 4 pages.

*Primary Examiner* — Jae Y Lee
*Assistant Examiner* — Aixa A Guadalupe Cruz
(74) *Attorney, Agent, or Firm* — Dorsey & Whitney LLP (57) ABSTRACT

A communication system comprises a first and a second master unit and at least one slave unit, wherein the second master unit is switched into a data transmission chain reaching from the first master unit to the slave unit in order to continue data transmission if a link fault occurs.

14 Claims, 6 Drawing Sheets

(56) References Cited

U.S. PATENT DOCUMENTS

2005/0088982 A1 4/2005 Ying
2005/0129037 A1 6/2005 Zumsteg et al.
2009/0222606 A1 9/2009 Janssen et al.

FOREIGN PATENT DOCUMENTS

| | | |
|---|---|---|
| DE | 19832248 | 1/2000 |
| DE | 10312907 | 10/2004 |
| JP | 54-079529 | 6/1979 |
| JP | 62-146043 | 6/1987 |
| JP | 01-228348 | 9/1989 |
| JP | 2003-179612 | 6/2003 |
| WO | 91/14324 | 9/1991 |
| WO | WO 91/14324 | 9/1991 |
| WO | WO 2004/084451 | 9/2004 |
| WO | WO 2006/108527 | 10/2006 |

\* cited by examiner

COMMUNICATION SYSTEM HAVING A MASTER/SLAVE STRUCTURE

This application is a continuation of PCT International Application No. PCT/EP2007/062831, filed Nov. 26, 2007, which claims priority to German Application No. 10 2006 055 889.8 filed Nov. 27, 2006, both of which are incorporated herein by reference.

FIELD

The present invention relates to a communication system having a master-slave structure and a master unit for such a communication system.

BACKGROUND

In production and automation technology, serial bus systems are increasingly used in which the remotely arranged devices of machine peripherals such as I/O modules, transducers, drives, valves and operator terminals communicate with automation, engineering and visual display systems via an efficient real-time communication system. In this arrangement, all users are networked via a serial bus, preferably via a field bus, the data exchange via the bus being in general carried out on the basis of the master-slave principle.

The active bus users on the bus system, the control devices, as a rule, possess a bus access authorization and determine the data transfer on the bus. The active bus users are called the master units in the serial bus system. In contrast, passive bus users are, as a rule, machine peripheral devices. They do not receive a bus access authorization, i.e. they are allowed to acknowledge only received information signals or transfer information signals to a master unit upon request by the latter. Passive bus users are called slave units in the serial bus system.

To avoid complex cabling, field bus systems having a master-slave structure are generally arranged in ring topology, all bus users being connected to a ring-shaped transmission path. An information signal generated by the master unit is fed into the ring-shaped transmission path by the master unit and successively passes through the slave units serially connected to the ring-shaped transmission path and is then received again and evaluated by the master unit.

As a rule, the information signals are organized by the master unit into data packets which are composed of control data and useful data, preferably using the Ethernet standard which provides for data packets having a length of up to 1500 bytes with a transmission speed which, at the same time, may be as high as 100 Mbit/sec. Each of the slave units connected to the ring-shaped transmission path processes the useful data intended for it of the Ethernet messages fed into the ring-shaped transmission path by the master unit.

As a rule, the master-slave communication systems having a ring structure are configured in such a manner that the master unit has a transmitter unit as data injection point and a receiving unit as data extraction point. The individual slave units are then connected together on the transmission path to form a ring, wherein each user is connected to two neighbors and the first and last user in the chain is connected to the master unit. The data packets are thereby transmitted in one direction starting from the master unit via its transmitter unit to the first connected slave unit and from there to the next one, until the last slave unit in the ring has been reached, and then back to the receiving unit of the master unit.

Each slave unit has a first terminal for receiving the circulating data packets from the previous user and a second terminal for forwarding to the following user, a processing unit being arranged between the two terminals in order to process the data packets passing through the slave unit.

A central demand for master-slave communication systems, particularly when they are used in production and process automation, is a high fault tolerance, that is to say the capability of the communication system to maintain the required function, i.e., for example, the production of a work piece, in spite of the occurrence of faults. In this context, faults in the communication system which must be overcome without impairment of the process are, in addition to faults in the data packets, also the failure of entire users, in particular the master unit in the transmission path or, respectively, an interruption in the transmission path, for example due to physical separation of the transmission medium.

SUMMARY

The present invention generally relates to a communication system comprising a master-slave structure and a master unit for such a communication system which allow with minimal hardware and switching efforts for the possibility of reconfiguring the master-slave structure in real time if the transmission path is interrupted and particularly if the master unit fails.

One embodiment of the invention provides a communication system comprising a first and a second master unit and at least one slave unit, the second master unit being switched into a data transmission chain reaching from the first master unit to the slave unit in order to continue data transmission if a link fault occurs.

Another embodiment of the invention provides a communication system comprising a first and a second master unit and at least one slave unit, which are connected to each other via a double-conductor structure. The first and the second master unit each comprises a transmitter unit for transmitting data signals connected to the double-conductor structure via first terminals, a receiving unit for receiving data signals connected to the double-conductor structure via second terminals and a control unit for transmitting data signals connected to the transmitter units and to the receiving units. The second master unit further comprises a master coupling unit connected between the control unit, the receiving unit and the transmitter unit in order to separate the control unit from the receiving unit and the transmitter unit in a first operating mode upon receiving data signal from the first master unit on the double-conductor structure and in order to connect the control unit with the receiving unit and the transmitter unit in a second operating mode upon interruption of the receipt of data signals from the first master unit on the double-conductor structure, in order to carry out a data transmission of the double-conductor structure.

Yet another embodiment of the invention provides a master unit comprising a transmitter unit for transmitting data signals, a receiving unit for receiving data signals, a control unit for transmitting data signals and a master coupling unit connected between the control unit, the transmitter unit and the receiving unit in order to automatically reconfigured a data transmission path in such a way that the master unit takes over a data transmission in a part of a master-slave communication system separated from a further master unit.

Yet another embodiment of the invention provides a master unit comprising a transmitter unit for transmitting data signals, which may be connected to a first communication path via a first terminal, a receiving unit for receiving data signals, which may be connected to a further communication path via a second terminal, a control unit for transmitting data signals and a master coupling unit. The master coupling unit is connected between the control unit, the transmitter unit and the receiving unit in order to separate the control unit from the receiving unit and the transmitter unit in a first operating mode and in order to connect the control unit to the receiving unit and the transmitter unit in a second operating mode in order to carry out a data transmission on the two communication paths.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is a schematic view of a communication system comprising a master-slave structure according to a first embodiment having a double-conductor structure, FIG. 1A showing normal mode and FIG. 1B showing reconfiguration mode.

FIG. 2 is a schematic view of a communication system comprising a master-slave structure according to a second embodiment having a replacement ring structure, FIG. 2A showing normal mode and FIG. 2B showing reconfiguration mode.

FIG. 3 is a schematic view of a communication system comprising a master-slave structure according to a third embodiment, FIG. 3A showing normal mode and FIG. 3B showing reconfiguration mode.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In automation technology, field bus systems are increasingly used in which devices of the machine peripherals, arranged in distributed manner, communicate with automation, engineering and visual display systems via a field bus. As a rule, the field bus system has a serial bus which can be, for example, an electrical line, an optical waveguide or a radio cable. All bus users are then connected to this field bus, a distinction being made between active bus users and passive bus users.

The active bus users on the field bus system are the master units which determine the data traffic on the bus. Such a master unit is, for example, an industrial PC which is used as process control computer in a production process. This master unit has a bus access authorization and can output data to the field bus without external request. The passive bus users on the bus system are peripheral machine devices, for example I/O devices, valves, drives and transducers. They are used as slave units and do not obtain a bus access authorization, i.e. they are allowed to acknowledge only received information signals or to transmit information signals to a master unit on request by the latter.

The communication standard used for data transmission in the master-slave communication system is preferably the Ethernet concept. In Ethernet communication systems, the data to be transmitted are encapsulated in data packets, also called messages in the further text, having a predetermined format. The Ethernet messages can have a data length of up to 1000 bytes containing, additionally to the useful data, control data which have a start identifier, a destination and source address, the data packet type and a fault mechanism.

Ethernet communication systems having a master-slave structure are preferably designed in such a manner that the individual master units are connected together via the transmission medium to form a chain, each slave unit being connected to two neighbors and the first and the last slave unit in the chain being connected to the master unit so that a ring structure is obtained. In this arrangement, the data are transmitted in one direction starting from the master unit to the first adjacent slave unit and from there to the next one as far as the last slave unit and then back to the master unit.

In order to allow for data communication to be maintained if a link fault occurs on the transmission path, in particular if the master unit fails, according to the invention a replacement master unit is provided in the master-slave communication system in addition to the regular master unit.

Figure 1A:
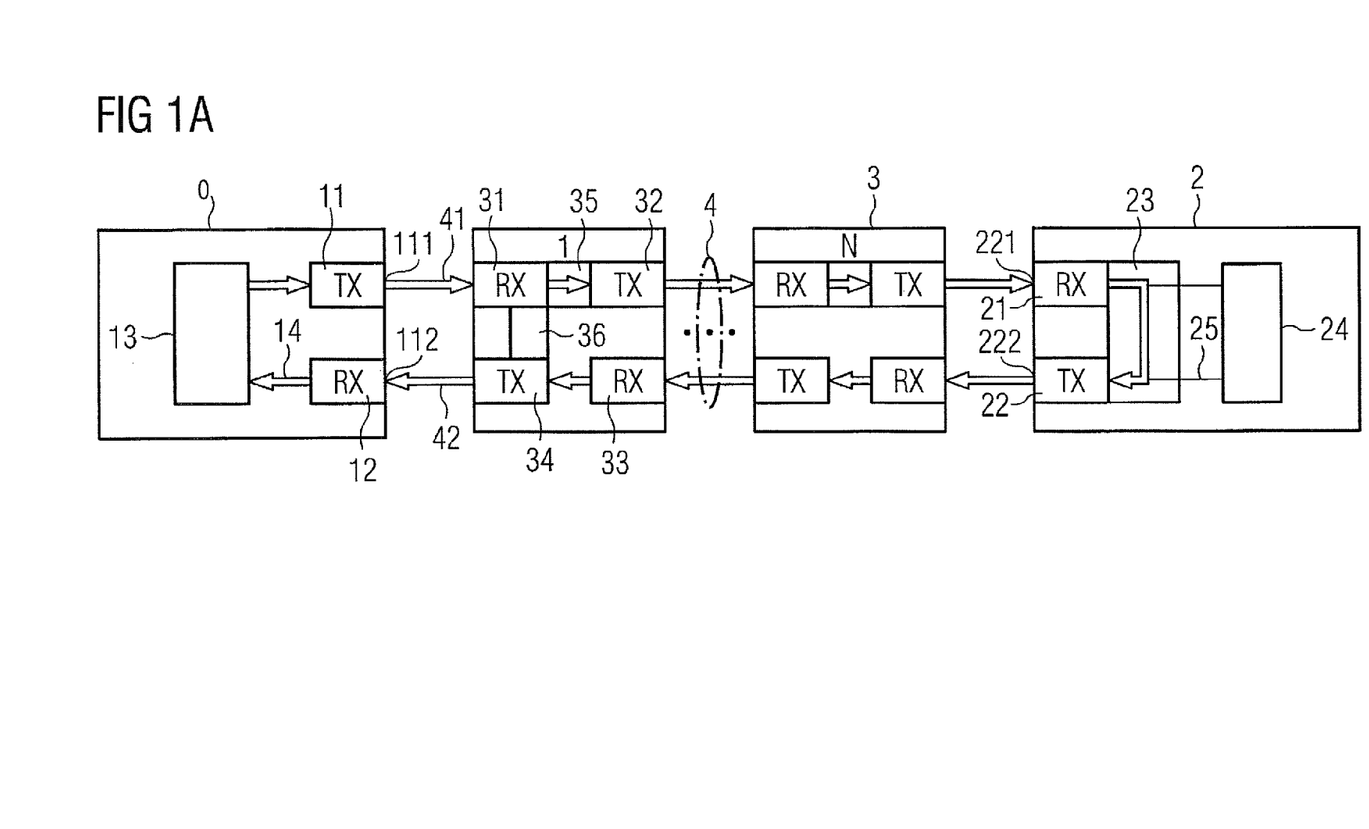
Figure 1B:
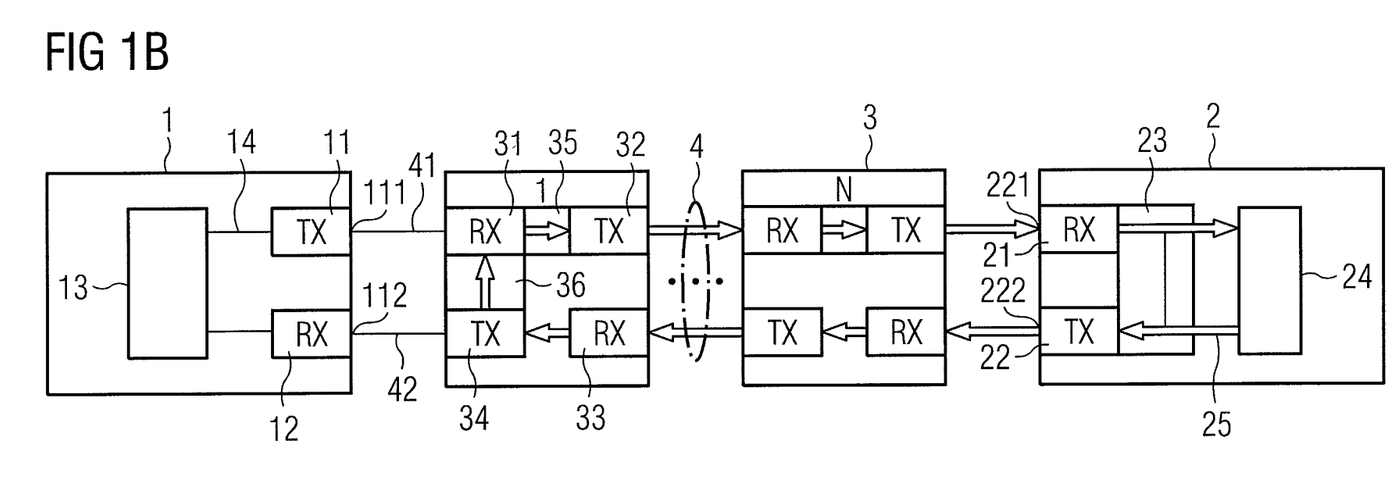

FIG. 1 shows a simplified diagram of a first embodiment of such a failure-tolerant master-slave communication system, FIG. 1A illustrating normal mode in which data exchange takes place via the regular master unit, and FIG. 1B illustrating a reconfiguration mode upon failure of the regular master unit and data transmission via the replacement master unit. The master-slave communication system comprises a first master unit 1, in the following also referred to as primary master unit, and a second master unit 2, in the following also referred to as replacement master unit, between which N slave units 3 are switched. In this arrangement, the primary master unit 1 and the replacement master unit 2 are connected via a double-conductor structure 4 to the N slave units 3. The double-conductor structure comprises two separate transmission paths, each forming an independent communication path 41, 42. In this context, an electrical line, an optical waveguide or a radio cable may serve as a transmission path.

The primary master unit 1 comprises a transmitter unit TX 11 and a receiving unit RX 12. The transmitter unit TX 11 is connected to the one end of the first communication path 41 via a first terminal 111 and the receiving unit RX 12 is connected to the one end of the second communication path 42 via a second terminal 112. The master unit 1 further comprises a controlling unit 13 connected to the transmitter unit TX 11 and to the receiving unit RX 12 via the control lines 14.

The replacement master unit 2 comprises a receiving unit RX 21 and a transmitting unit TX 22. The receiving unit RX 21 is connected to the second end of the first communication path 41 via a first terminal 221 and the transmitting unit TX 22 is connected to the second end of the second communication path 42 via a second terminal 222. The replacement master unit 2 further comprises a master coupling unit 23 switched between a controlling unit 24 and its control lines 25 and the receiving unit RX 21 and the transmitting unit TX 22.

Each slave unit 3 comprises a first terminal with a first receiving unit RX 31 for receiving the data packets from a previous user via the first communication path 41 and a second terminal having a first transmitting unit TX 32 for forwarding the data packets to the next user via the first communication path 41. Furthermore, each slave unit 3 comprises a third terminal comprising a second receiving unit RX 33 for receiving the data packets via the second communication path 42 from a previous user and a fourth terminal having a second transmitting unit TX 34 for forwarding the data packets via the second communication path 42 to the subsequent user. In this arrangement, the first receiving unit RX 31 of the slave unit 3 connected to the first communication path 41 and the second transmitting unit TX 34 connected to the second communication path 42 are connected to form a common port 0. The second receiving unit RX 33 connected to the second communication path 42 and the transmitting unit TX 32 connected to the first communication path 41 are connected to form a common port 1. A processing unit 35 is switched into the first communication path 41 between the first receiving unit RX 31 and the first transmitting unit TX 32. The second communication path 42 is looped in by the slave unit 3 from the receiving unit RX 33 to the transmitting unit TX 34. The slave unit adjacent to the primary master unit 1 further comprises a coupling unit 36 in port 0 connected to the primary master unit 1, the coupling unit 36 being switched between the first receiving unit RX 31 and the second transmitting unit TX 34.

FIG. 1A shows the failure-free normal mode of the master-slave communication system. The direction of the data transmission on conductors 14, 25 in the master and/or slave units as well as on the communication paths 41, 42 is indicated as an arrow, the conductors and transmission paths respectively used for data transmission being emphasized. In a failure-free normal mode, a data packet generated by the central control unit 13 of the primary master unit 1 is outputted onto the first communication path 41 via the transmitter unit TX 11 and the first terminal 111. The message is then received by the first connected slave unit 3 via the first receiving unit RX 31 in port 0 and forwarded to the first transmitter unit TX 32 in port 1 via the processing unit 35 comprised by the slave unit 3, the data packet being processed by the processing unit 35 of the slave unit 3 during cycling. The first transmitter unit TX 32 in port 1 of the slave unit 3 then transmits the data packet to the next slave unit 3 in the direction of transmission on the first communication path 41.

In this manner, the data packet consecutively cycles through all slave units 3 connected on the first communication path 41 and is transmitted from the last slave unit 3 to the receiving unit RX 21 of the replacement master unit 2 on the first communication path 41 via the first terminal 221. In normal mode, the master coupling unit 23 of the replacement master unit 2 short-circuits the receiving unit RX 21 and the transmitter unit TX 22 via the control lines 25 and the transmitter unit TX 22 of the replacement master unit 2 feeds the data packet back via terminal 22 on the second communication path 42. On its way back, the data packet consecutively runs through the slave units 3 connected to the second communication path 42 in the direction of data transmission, as on its way there, starting from the slave unit N up to slave unit 3, the data packet being looped in the slave units 3 in an unprocessed state.

The last slave unit in the direction of data transmission on the second communication path 42 then transmits the data packet through the second transmitter unit TX 34 in port 0 and via the second terminal 112 of the primary master unit 1 to its receiving unit RX 12, from where the data packet is then transmitted to the central control unit 13.

FIG. 1B indicates the course of the data transmission in the master-slave communication system during failure of the primary master unit 1. The reconfiguration of the data transmission during failure of the primary master unit 1 is triggered by the port 0 of the first slave unit 3 adjacent to the failing primary master unit 1 as well as by the master coupling unit 23 of the replacement master unit 2. The port 0 of the slave unit 3 adjacent to the primary master unit may determine by means of a recognition method whether communication with the primary master unit 1 may take place via the two communication paths 41, 42. If an interruption of the communication of port 0 of the slave unit 3 is recognized, the slave coupling unit 36 triggers the link fault operation of the slave unit 3. The slave coupling unit 36 then connects the terminal of the first receiving unit RX 31 to the first communication path 41 and the terminal of the second transmitter unit TX 34 to the second communication path 42. At the same time, the slave coupling unit 36 connects the first communication path 41 to the second communication path 42.

In parallel to taking up the link fault mode by the slave unit 3 adjacent to the primary master unit 1, the replacement master unit 2 starts transmitting data. The link fault mode of the replacement master unit 2 is triggered by the master coupling unit 23 which determines a timeout of the data transmission on the first communication path 41 due to the failure of the primary master unit 1. The master coupling unit 23 then opens the short-circuit between the transmitter unit TX 22 and the receiving unit RX 21 and opens the conductor connection between the central control unit 24 and the transmitter unit TX 22 and the receiving unit RX 21 via the control lines 25.

The control unit 24 determines the opening of the control lines 25 and then automatically starts transmitting by outputting a data packet it has generated via the transmitter unit TX 22 and the second terminal 222 onto the second communication path 42. On the second communication path 42, the data packet then runs consecutively through all slave units 3 connected thereto. When the data packet has reached the slave unit 3 being in link fault mode and being adjacent to the failing primary master unit 1, it is redirected from the second communication path 42 to the first communication path 41 by the short-circuit generated in the slave unit 3 by the slave coupling unit 36, whereby the data packet runs through the processing unit 35 comprised by the slave unit 3 in link fault mode on its way back. The data packet is then forwarded from the slave unit 3 in link fault mode to the adjacent slave unit 3 in the direction of transmission on the first communication path 41 and from there to the next slave unit 3, until the data packet is fed back to the receiving unit RX 21 of the replacement master unit 2 via terminal 221, which forwards the received data packet via the control line 25 to the control unit 24 for evaluation. The reconfigured data transmission path is emphasized in FIG. 1B and the direction of data transmission is characterized by means of arrows.

As an alternative for a single slave unit comprising a slave coupling unit, it is also possible that all slave units comprise such a slave coupling unit. In the case of occurring link faults, i.e. if the transmission paths between the slave units are interrupted and/or if a slave unit fails, the adjacent slave units may close down the respective port next to the link fault and connect the first communication path 41 to the second communication path 42. The data transmission may then be carried out in two portions, the slave units 3 on the one side up to the slave unit next to the link fault being provided with data packets by the primary master unit 1. On the other data transmission side of the link fault, on the other hand, the replacement master unit 2 takes over transmitting and receiving. Thus, it is possible to maintain data transmission not only in case the primary master unit fails, but also upon occurrence of a link fault by reconfiguring the data transmission paths using both master units.

FIG. 2 shows a second embodiment of a master-slave communication system according to the invention carrying out a reconfiguration operation in case the primary master unit fails. In the simplified diagrams of FIG. 2, the same reference numerals are used for similar components as for the embodiment of FIG. 1. The design of the primary master unit 1 and of the slave units 3 corresponds to the units represented in FIG. 1. In addition to the components illustrated in FIG. 1, the replacement master unit 200 comprises a third terminal 223 having a second transmitter unit TX 26, a master coupling unit 230 being switched between the control lines 250 of the control unit 24, the receiving unit RX 21, the first transmitter unit TX 22 and the second transmitter unit TX 26. The second transmitter unit TX 26 is connected to the receiving unit RX 12 of the primary master unit 1 via a separate third master communication path 43.

Figure 2A:
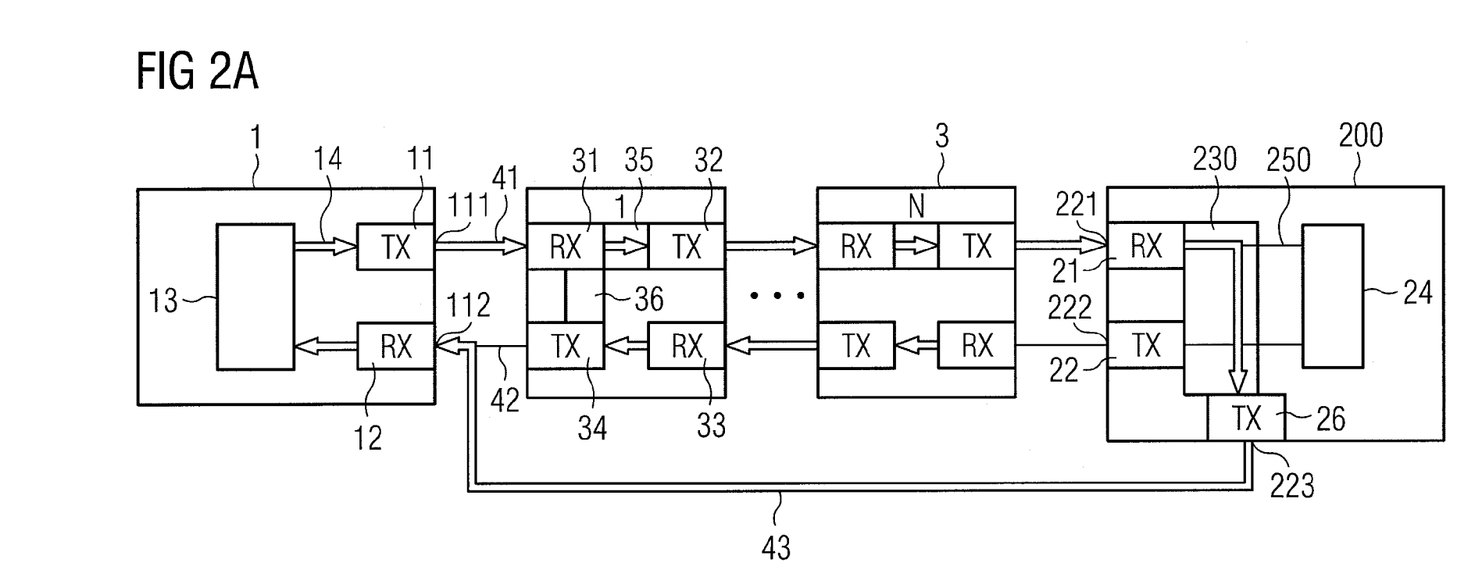
Figure 2B:
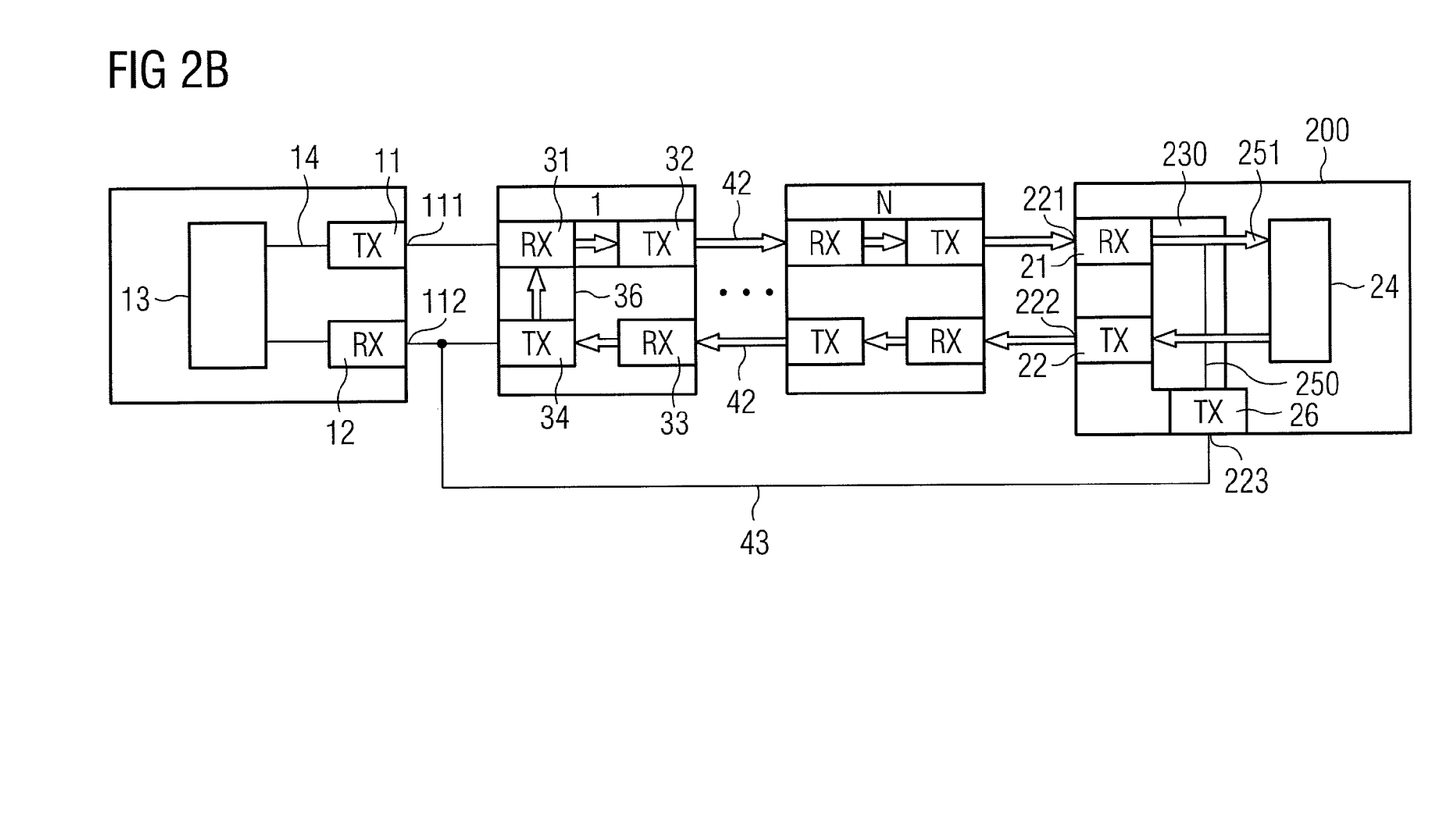

FIG. 2A shows the normal mode during data transmission by the primary master unit 1 and FIG. 2B shows the reconfiguration mode if the primary master unit 1 fails and transmission is carried out by the replacement master unit 200. In the case of a failure-free normal mode, as illustrated in FIG. 2A, data transmission is carried out starting from the transmitter unit TX 11 of the primary master unit 1 via the first slave communication path 41, the data running through all slave units 3 connected in series and their processing units 35. The data packet is then forwarded from the last slave unit via the first terminal 221 to the receiving unit RX 21 of the replacement master unit 200. In normal mode, the master coupling unit 230 of the replacement master unit has short-circuited the receiving unit RX 21 with the second transmitter unit TX 26 so that the data packet is fed back from the second transmitter unit TX 26 via the third terminal 223 and the third master communication conductor 43 to the second terminal 112 and the receiving unit RX 12 of the primary master unit 1.

The second slave communication path 42 is not used in normal mode und merely serves as a replacement communication path in case of a link fault, in particular if the primary master unit 1 fails, as is depicted in FIG. 2B.

During reconfiguration of the data transmission path as shown in FIG. 2B which is initiated upon failure of the primary master unit 1, the slave unit 3 adjacent to the primary master unit 1 connects port 0 to the primary master unit 1 in a similar manner as shown in FIG. 1. Furthermore, the slave coupling unit 36 of the slave unit 3 connects the first communication path 41 to the second communication path 42. At the same time, the master coupling unit 230 of the replacement master unit 200 establishes a connection of the central control unit 24 with the first transmitter unit TX 22 and the first receiving unit RX 21, interrupts the connection existing between the first receiving unit RX 21 and the second transmitter unit TX 26 in normal mode and connects the third terminal 223 with the third master communication path 43.

The transmitting operation by means of the replacement master unit 200 is carried out analogously to the transmitting operation illustrated in FIG. 1B, in which the data packet is forwarded starting from the replacement master unit 200 via the second communication path 42 up to the slave unit 3 adjacent to the primary master unit 1 and is then fed back to the receiving unit RX 21 of the replacement master unit 200 via the first communication path 41.

Furthermore, as in the embodiment shown in FIG. 1, it is possible that not only the first slave unit 3 adjacent to the primary master unit 1 comprises a slave coupling unit 36 in order to carry out a failure operation, but also the other slave units 3 in order to be able to carry out an additional reconfiguration mode upon occurrence of a link fault, if necessary. It is then again possible to carry out data transmission in a bipartite process, the slave units 3 on the one side up to the slave units 3 adjacent to the link fault being provided with data packets by the primary master unit 1, while on the other data transmission side with regard to the link fault the transmitting and receiving is carried out by the replacement master unit 200. Thus, data transmission is not only maintained during a failure of the primary master unit, but also upon occurrence of a link fault by reconfiguring the data transmission paths using both master units.

Figure 3A:
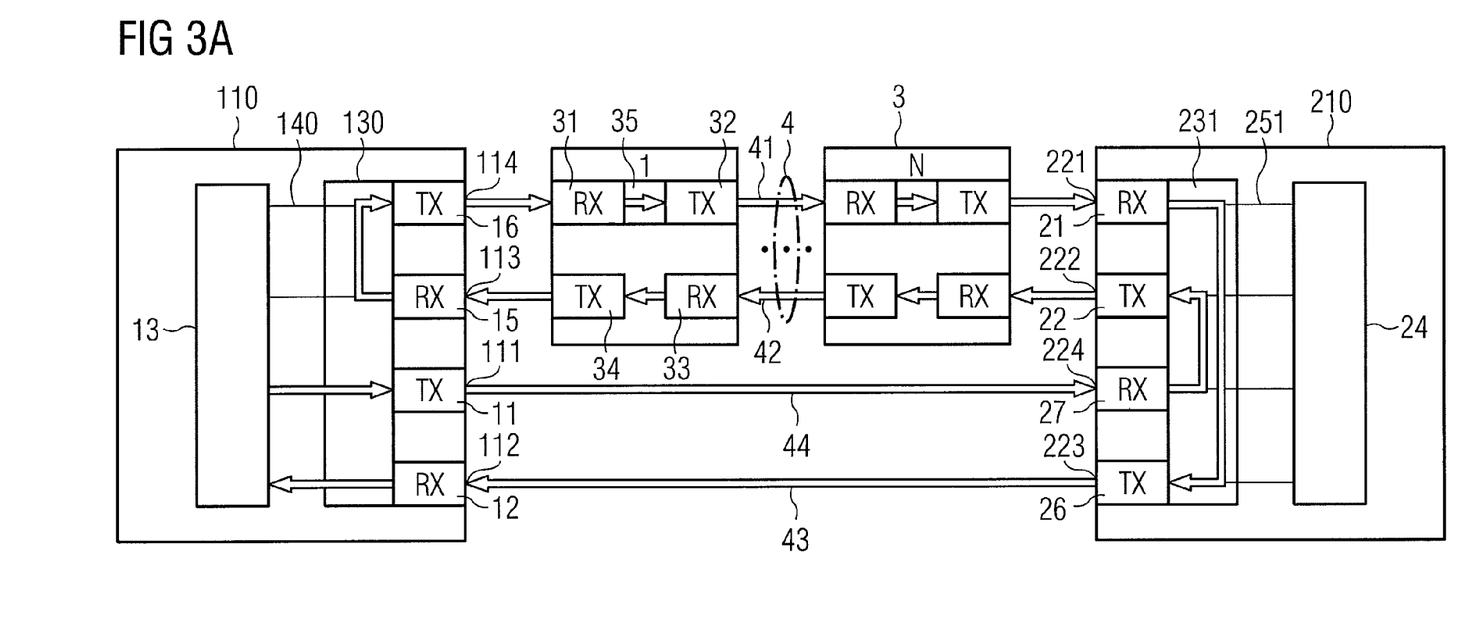
Figure 3B:
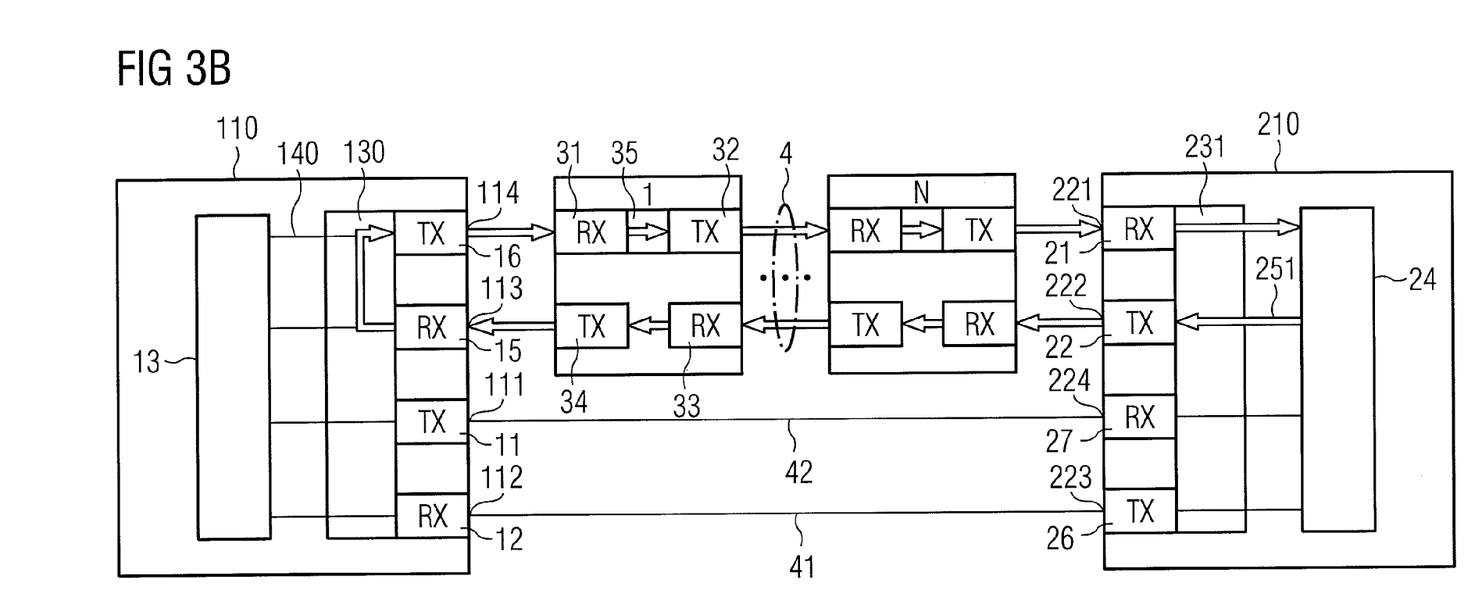

FIG. 3 shows a simplified diagram of a third embodiment of a failure-tolerant master-slave communication system according to the invention, FIG. 3A showing the normal operation and FIG. 3B showing a reconfiguration mode upon failure of the primary master unit. In the illustrations of FIGS. 3A and 3B, similar components are again referred to by the same reference numerals as in FIGS. 1 and 2. The communication system comprises a primary master unit 110, the receiving unit RX 12 of which is connected to a first master communication path 43 via the second terminal 112 and the transmitter unit TX 11 of which is connected to a second master communication path 44 via the terminal 111. Moreover, a second transmitter unit TX 16 and a second receiving unit RX 15 are provided. The second transmitter unit TX 16 is connected to the first communication path 41 via a third terminal 114. The second receiving unit RX 15 is connected with the second communication path 42 via a fourth terminal 113.

A master coupling unit 130 is switched between the first transmitter unit TX 11, the first receiving unit RX 12, the second transmitter unit TX 16 and the second receiving unit RX 15 and the control unit 13 of the primary master unit 110, which switches on the control lines 140 between the central control unit 13 and the transmitter and/or receiving units according to the respective operating mode, i.e. normal mode and reconfiguration mode.

A replacement master unit 210 is designed symmetrically with regard to the primary master unit and, similar to the embodiment shown in FIG. 3, comprises two transmitter units TX 22, TX 26, which are connected to the second communication path 42 and/or the first master communication path 43 via the first terminal 222 and the third terminal 223. Apart from the receiving unit RX 21, which is connected with the first communication path 41 via the second terminal 221, a further second receiving unit RX 27 is provided which is connected to the second master communication path 44 via a fourth terminal 224. In the replacement master unit 210, a master coupling unit 231 is switched between the control unit 24 and the transmitter and/or receiving units RX 21, TX 22, TX 26, RX 27, the master coupling unit 231 turning on control lines 251 between the central control unit 24 and the transmitter and/or receiving units according to the respective operating mode, i.e. normal mode and reconfiguration mode.

In this context, the slave units are designed analogously to the slave units shown in FIGS. 1 and 2, comprising a port 0 and a port 1 which comprise a combination of a transmitter unit and a receiving unit, respectively. However, in the slave unit 3 adjacent to the primary master unit 110 a coupling unit connecting the first receiving unit RX 31 and the second transmitter unit TX 34 in the port 0 may be dispensed with in this connection.

FIG. 3A shows a failure-free normal operation in the master-slave communication system. The direction of data transmission is thereby indicated as an arrow, the conductors and transmission paths respectively used for the data transmission being emphasized. In a failure-free normal mode of the master-slave communication system, a data packet is forwarded from the central control unit 13 of the primary master unit 110 via the master coupling unit 130 to the first transmitter unit TX 11 which outputs the data packet onto the second master communication path 44. The telegram is then received by the second receiving unit RX 27 of the replacement master unit 210 connected to said second master communication path 44 and coupled to the first transmitter unit TX 22 by short-circuiting the control line 251 by means of the master coupling unit 321, the transmitter unit TX 22 outputting the data packet via the second communication path 42 to the slave unit N connected thereto.

The data packet is then looped in all slave units serially connected to the second communication path 42 and transferred from the slave unit 3 adjacent to the primary master unit 110 to the second receiving unit RX 15 of the primary master unit 110. In normal mode, the master coupling unit 130 in the primary master unit 110 connects the second receiving unit RX 15 to the second transmitter unit TX 16 which then outputs the received data packet onto the first communication path 41. The data packet then again cycles through all slave units serially connected to said first communication path 41, the data packet in cycle being processed by the respective processing unit 35 arranged in the data path. Starting from the last slave unit N, the data packet is then fed back to the first receiving unit RX 21 of the replacement master unit 210, which is short-circuited with the second transmitter unit TX 26 via the master coupling unit 231. The second transmitter unit TX 26 then transmits the data packet back to the first receiving unit RX 12 of the primary master unit 110 via the first master communication path 43, which forwards the data packet to the control unit 13 for evaluation.

If the primary master unit fails, the master-slave communication system switches to the link fault mode shown in FIG. 3B. The master coupling unit 231 in the replacement master unit 210 determines a time-out during the transmission of data from the primary master unit 110 on the second master communication path 44 and opens the short-circuits between the first receiving unit RX 21 and the second transmitter unit TX 26 and/or the second receiving unit RX 27 and the first transmitter unit TX 22. The control unit 24 of the replacement master unit 210 determines the opening of the short-circuits and automatically starts transmitting by outputting a data packet generated by the central control unit 24 onto the second communication path 42 via the first transmitter unit TX 22 and the second terminal 222. The data packet then cycles through the slave units connected to the second communication path 42 and the primary master unit in a manner analogous to normal mode, the primary master unit short-circuiting the first and the second communication path via the coupling unit 130. The data packet, which is subsequently processed by the slave units on its way back via the first communication path 41, is then received by the first receiving unit RX 21 of the replacement master unit 210 and forwarded to the control unit 24 for evaluation.

By means of the embodiment shown in FIG. 3, it is possible to design the primary master unit and the replacement master unit identically. As an alternative, however, the coupling unit and the second port comprising the second transmitter unit TX 16 and the second receiving unit RX 15 can be dispensed within the primary master unit. In this case, the data packet has to be fed back from the second communication path 42 to the first communication path 41 in the last slave unit 3 prior to the master unit via an additional coupling unit 36, as it is comprised by the slave unit in port 0 shown in FIGS. 1 and 2.

If instead of the failure of the primary master unit the data communication line between the slave units is interrupted and/or a slave unit has failed and the slave units comprise respective coupling units between the first and the second communication path, it is alternatively possible to carry out the data transmission in two portions, the slave units on the one side of the link fault being provided with data packets by the primary master unit 110. On the other data transmission side with regard to the link fault, however, the replacement master unit 210 transmits the data packets. The primary master unit 110 thereby transmits via the second transmitter unit TX 16 and receives via the second receiving unit RX 15, which are accordingly switched to the control unit 13 by the coupling unit 130. In the replacement master unit 210, the first transmitter unit TX 22 transmits and receives via the first receiving unit RX 21, the transmitter unit TX 22 and the receiving unit RX 21 being connected to the central control unit 24 by the coupling unit 231 for this purpose. Thus, the embodiment shown in FIG. 3 allows for maximum failure tolerance in the master-slave communication system.

The present invention provides to a communication system comprising a master-slave structure and a master unit for such a communication system which allow with minimal hardware and switching efforts for the possibility of reconfiguring the master-slave structure in real time if the transmission path is interrupted and particularly if the master unit fails.

According to an embodiment, a first and a second master unit and at least one slave unit are connected to each other in a communication system via a double-conductor structure. The first and the second master unit each comprise a transmitter unit for transmitting data signals which are connected to the double-conductor structure via first terminals, a receiving unit for receiving data signals which are connected to the double-conductor structure via second terminals, and a controlling unit for transmitting data signals connected to the transmitting units and to the receiving units. The second master unit further comprises a master coupling unit switched between the controlling unit, the receiving unit and the transmitter unit in order to separate the controlling unit from the receiving unit and the transmitter unit in a first operating mode upon receiving data signals from the first master unit on the double-conductor structure and in order to connect the controlling unit to the receiving unit and the transmitter unit in a second operating mode upon interrupting the receipt of data signals of the first master unit on the double-conductor structure in order to carry out a data transmission on the double-conductor structure.

According to an embodiment, the second replacement master unit is switched into the data transmission chain reaching from the first regular master unit to the slave units in order to continue data transmission if a link fault occurs, particularly if the first regular master unit fails.

A master unit for use as a replacement master unit comprises a transmitter unit for transmitting data signals, which may be connected to the first communication path via a first terminal, a receiving unit for receiving data signals which may be switched to a communication path via a second terminal, and a controlling unit for transmitting data signals and a master coupling unit. In this arrangement, the master coupling unit is connected between the controlling unit, the transmitter unit and the receiving unit in order to separate the controlling unit from the receiving unit and from the transmitter unit in a first operating mode, i.e. in normal mode, and in order to connect the controlling unit to the receiving unit and the transmitter unit in a second operating mode, i.e. in a link fault mode for carrying out a data transmission on the first and the second communication path.

By means of the embodiment of a master-slave communication system and/or of a replacement master unit it is possible to continue data transmission via the replacement master unit in a simple manner, in particular if the regular master unit fails. According to the invention, the data transmission path is automatically reconfigured in such a way that the replacement master unit takes over the data transmission in the part of the master-slave communication system which is separated from the regular master unit.

According to an embodiment, the first and the second master unit are provided in the communication system between which the at least one slave unit is arranged. The slave unit comprises a slave coupling unit and a first, second, third and fourth terminal. The first terminal of the slave unit is connected to the transmitter unit of the first master unit and the second terminal of the slave unit is connected to the receiving unit of the second master unit via a first communication path of the double-conductor structure. The third terminal of the slave unit is connected to the transmitter unit of the second master unit and the fourth terminal of the slave unit is connected to the receiving unit of the first master unit via a second communication path of the double-conductor structure. In the first operating mode, i.e. in normal mode, the master coupling unit of the second master unit short-circuits the first terminal connected to the transmitter unit and the second terminal connected to the receiving unit of the second master unit and data transmission takes place via the first master unit, exclusively. In the second operating mode, i.e. if a link fault occurs, the slave coupling unit of the slave unit short-circuits the first terminal of the slave unit with the fourth terminal of the slave unit. Simultaneously, the master coupling unit of the second master unit opens the short-circuit of the first and the second terminal of the second master unit for data transmission on the first and second communication path and connects the controlling unit to the transmitter unit and to the receiving unit for the data transmission mode.

According to an embodiment of the master unit, the master coupling unit short-circuits the first terminal connected to the transmitter unit and the second terminal connected to the receiving unit in the first operating mode and opens the short circuit of the first and second terminal in the second operating mode.

According to a further embodiment of the communication system, the slave unit comprises at least one first, second and third terminal, the first terminal of the slave unit being connected to the transmitter unit of the first master unit and the second terminal of the slave unit being connected to the receiving unit of the second master unit via a first communication path of the double-conductor structure. The third terminal of the slave unit is connected to the transmitter unit of the second master unit via a second communication path of the double-conductor structure and a third terminal of the second master unit is connected to the receiving unit of the first master unit via a third communication path of the double-conductor structure. In the first operating mode, i.e. in normal mode, the master coupling unit of the second master unit short-circuits the second terminal connected to the receiving unit and the third terminal of the second master unit and data transmission is carried out starting from the first master unit via the first and the third communication path. In the second operating mode, i.e. upon occurrence of a link fault, the slave coupling unit of the slave unit short-circuits the first terminal of the slave unit with the fourth terminal of the slave unit and the master coupling unit of the second master unit opens the short-circuit of the second and third terminal of the second master unit for data transmission on the first and second communication path and connects the controlling unit to the transmitter unit and to the receiving unit for a data transmitting mode.

According to another embodiment of the master unit, a third terminal which may be connected to a third communication path is provided. In that case, the master coupling unit short-circuits the second terminal connected to the receiving unit and the third terminal in the first operating mode and opens the short-circuit of the second and third terminal in the second operating mode.

According to a further embodiment, the slave unit comprises a first and a second terminal, the first terminal of the slave unit being connected to the receiving unit of the second master unit via a first communication path of the double-conductor structure, the second terminal of the slave unit being connected to the transmitter unit of the second master unit via a second communication path of the double-conductor structure, a third terminal of the second master unit being connected to the receiving unit of the first master unit via a third communication path of the double-conductor structure and a fourth terminal of the second master unit being connected to the transmitter unit of the first master unit via a fourth communication path of the double-conductor structure. In the first operating mode, i.e. in normal mode, the master coupling unit of the second master unit respectively short-circuits the first terminal connected to the transmitter unit and the fourth terminal of the second master unit, and the second terminal connected to the receiving unit and the third terminal of the second master unit and data transmission is exclusively carried out via the first master unit. In the second operating mode, i.e. if a link fault occurs, the master coupling unit of the second master unit for data transmission on the first and second communication path opens the short-circuit of the first and fourth terminal of the second master unit and the short-circuit of the second and third terminal of the second master unit and connects the controlling unit to the transmitting unit and to the receiving unit for data transmission.

According to a further embodiment of the master unit, a third terminal which may be coupled to a third communication path and a fourth terminal which may be coupled to a fourth communication path are provided. In the first operating mode, the master coupling unit short-circuits the second and the third terminal as well as the first and the fourth terminal and in the second operating mode opens the short-circuit of the second and third as well as of the first and fourth terminal.

In an embodiment, the transmission path is configured as a physical line having a double-conductor structure, the slave unit respectively comprising two ports having two terminals each, to which the double-conductor structure is connected. The transmission chain is completed by the regular master unit on the one side and by the replacement master unit on the other side. In normal operation, the regular master unit transmits and receives via the double-conductor structure, the replacement master unit serving as a conductor end which short-circuits the double-conductor in order to feed the data packets arriving on the first conductor from the regular master unit back to the regular master unit via the second conductor. If a link fault occurs, in particular if the regular master unit fails, the slave unit short-circuits its port which is coupled to the regular master unit. At the same time, the master coupling unit of the replacement master unit opens the internal short-circuit and connects the one first control conductor of the control unit to the transmitter unit and another second control conductor of the control unit to the receiving unit in order to start transmitting data.

In a further embodiment, the master-slave communication system is configured as a ring structure, the replacement master unit being arranged upstream of the receiving unit of the regular master unit with regard to the direction of data transmission in normal mode in order to feed back the transmitted data packets to the regular master unit. In failure mode upon occurrence of a link fault, in particular if the regular master unit fails, the master coupling unit opens this short-circuit and connects the transmitting unit and the receiving unit to the controlling unit in order to start transmitting data.

In a further embodiment, the master-slave communication system is configured as a ring structure, the replacement master unit being arranged between the slave units and the regular master unit with regard to the direction of data transmission in normal mode in order to forward the data packets to the regular master unit. In failure mode, if a link fault occurs, in particular upon failure of the regular master unit, the master coupling unit opens these short-circuits and connects the controlling unit to the transmitter unit and the receiving unit to start transmitting data.

By means of said three above specified configurations of a master-slave communication systems having a replacement master unit, it is possible in the case of a link fault, in particular if the regular master unit fails, to continue data transmission in a simple manner by means of the replacement master unit. According to the invention, the data transmission path is automatically reconfigured in such a way that the replacement master unit takes over data transmission in the part of the master-slave communication system separated from the regular master unit.

By means of said three above specified configurations of a master-slave communication system having a replacement master unit, it is possible in the case of a link fault, in particular if the regular master unit fails, to continue data transmission in a simple manner by means of the replacement master unit. According to the invention, the data transmission path is automatically reconfigured in such a way that the replacement master unit takes over data transmission in the part of the master-slave communication system separated from the regular master unit.

While the foregoing is directed to embodiments of the invention, other and further embodiments of this invention may be devised without departing from the basic scope of the invention, the scope of the present invention being determined by the claims that follow.

The invention claimed is:

1. A communication system comprising a first and a second master unit and at least one slave unit, the second master unit being switched into a data transmission chain reaching from the first master unit to the slave unit to continue data transmission if a link fault occurs,
the data transmission chain comprising double-conductor structure having a first, second and third communication path, the first and the second master unit each comprising a transmitter unit for transmitting data signals connected to the double-conductor structure via first terminals, a receiving unit for receiving data signals connected to the double-conductor structure via second terminals, and a control unit for transmitting data signals connected to the transmitter units and to the receiving units,
the second master unit further comprising a master coupling unit connected between the control unit, the receiving unit and the transmitter unit in order to separate the control unit from the receiving unit and the transmitter unit in a first operating mode upon receiving data signal from the first master unit on the double-conductor structure and in order to connect the control unit with the receiving unit and the transmitter unit in a second operating mode upon interruption of the receipt of data signals from the first master unit on the double-conductor structure, in order to carry out a data transmission of the double-conductor structure,
the second master unit further comprising a third terminal which is connected to the third communication path, wherein the master coupling unit short-circuits the second terminal connected to the receiving unit and the third terminal in the first operating mode and opens the short-circuit of the second and third terminal in the second operating mode.

2. The communication system according to claim 1, the second master unit being configured so as to determine the failure of a transmitting operation of the first master unit and to trigger the switching into the data transmission chain between the first operating mode and the second operating mode.

3. The communication system according to claim 1,
the slave unit comprising a slave coupling unit and a first, second, third and fourth terminal,
the first terminal of the slave unit being connected to the transmitter unit of the first master unit and the second terminal of the slave unit being connected to the receiving unit of the second master unit via the first communication path of the double-conductor structure, the third terminal of the slave unit being connected to the transmitter unit of the second master unit and the fourth terminal of the slave unit being connected to the receiving unit of the first master unit via the second communication path of the double-conductor structure,
wherein in the first operating mode, the master coupling unit of the second master unit short-circuits the first terminal connected to the transmitter unit and the second terminal connected to the receiving unit of the second master unit, and
wherein in the second operating mode, the slave coupling unit of the slave unit short-circuits the first terminal of the slave unit with the fourth terminal of the slave unit and the master coupling unit of the second master unit opens for data transmission on the first and second communication path the short-circuit of the first and second terminal of the second master unit and connects the control unit to the transmitter unit and the receiving unit.

4. The communication system according to claim 1,
the slave unit comprising a slave coupling unit and a first, second, third and fourth terminal,
wherein the first terminal of the slave unit is connected to the transmitter unit of the first master unit and the second terminal of the slave unit is connected to the receiving unit of the second master unit via the first communication path of the double-conductor structure, the third terminal of the slave unit is connected to the transmitter unit of the second master unit via the second communication path of the double-conductor structure and the third terminal of the second master unit is connected to the receiving unit of the first master unit via the third communication path of the double-conductor structure,
wherein in the first operating mode, the master coupling unit of the second master unit short-circuits the second terminal connected to the receiving unit and the third terminal of the second master unit, and wherein in the second operating mode, the slave coupling unit of the slave unit short-circuits the first terminal of the slave unit with the fourth terminal of the slave unit and the master coupling unit of the second master unit opens the short-circuit of the second and third terminal of the second master unit for data transmission on the first and second communication path and connects the control unit to the transmitter unit and the receiving unit.

5. The communication system according to claim 1, the slave unit comprising a first and a second terminal, wherein the first terminal of the slave unit is connected to the receiving unit of the second master unit via the first communication path of the double-conductor structure, the second terminal of the slave unit is connected to the transmitter unit of the second master unit via the second communication path of the double-conductor structure, the third terminal of the second master unit is connected to the receiving unit of the first master unit via the third communication path of the double-conductor structure and a fourth terminal of the second master unit is connected to the transmitter unit of the first master unit via a fourth communication path of the double-conductor structure, wherein in the first operating mode, the master coupling unit of the second master unit respectively short-circuits the first terminal connected to the transmitter unit and the fourth terminal of the second master unit and the second terminal connected to the receiving unit and the third terminal of the second master unit, and wherein in a second operating mode, the master coupling unit of the second master unit opens the short-circuit of the first and fourth terminal of the second master unit and the short-circuit of the second and third terminal of the second master unit for transmitting data on the first and second communication path and connects the control unit with the transmitter unit and the receiving unit.

6. The communication system according to claim 5, the slave unit comprising a third and a fourth terminal, whereby the third terminal of the slave unit is connected with a third terminal of the first master unit via the first communication path of the double-conductor structure and the fourth terminal of the slave unit is connected to a fourth terminal of the first master unit via the second communication path of the double-conductor structure, and whereby the first master unit further comprises a master coupling unit in order to short-circuit the third and the fourth terminal of the first master unit.

7. A communication system comprising a first and a second master unit and at least one slave unit, which are connected to each other via a double-conductor structure, the first an the second master unit each comprising a transmitter unit for transmitting data signals connected to the double-conductor structure via first terminals, a receiving unit for receiving data signals connected to the double-conductor structure via second terminals, and a control unit for transmitting data signals connected to the transmitter units and to the receiving units, the second master unit further comprising a master coupling unit connected between the control unit, the receiving unit and the transmitter unit to separate the control unit from the receiving unit and the transmitter unit in a first operating mode upon receiving data signal from the first master unit on the double-conductor structure and to connect the control unit with the receiving unit and the transmitter unit in a second operating mode upon interruption of the receipt of data signals from the first master unit on the double-conductor structure, to carry out a data transmission of the double-conductor structure, the slave unit comprising a slave coupling unit and a first, second, third and fourth terminal, wherein the first terminal of the slave unit is connected to the transmitter unit of the first master unit and the second terminal of the slave unit is connected to the receiving unit of the second master unit via a first communication path of the double-conductor structure, the third terminal of the slave unit is connected to the transmitter unit of the second master unit via a second communication path of the double-conductor structure and a third terminal of the second master unit is connected to the receiving unit of the first master unit via a third communication path of the double-conductor structure, wherein in the first operating mode, the master coupling unit of the second master unit short-circuits the second terminal connected to the receiving unit and the third terminal of the second master unit, and wherein in the second operating mode, the slave coupling unit of the slave unit short-circuits the first terminal of the slave unit with the fourth terminal of the slave unit and the master coupling unit of the second master unit opens the short-circuit of the second and third terminal of the second master unit for data transmission on the first and second communication path and connects the control unit to the transmitter unit and the receiving unit.

8. The communication system according to claim 7, the second master unit being configured so as to determine the failure of a transmitting operation of the first master unit and to trigger the second operating mode.

9. A master unit comprising:
a transmitter unit for transmitting data signals;
a receiving unit for receiving data signals;
a control unit for transmitting data signals; and
a master coupling unit connected between the control unit, the transmitter unit and the receiving unit to automatically reconfigured a data transmission path in such a way that the master unit takes over a data transmission in a part of a master-slave communication system separated from a further master unit; wherein the transmitter unit for transmitting data signals is connected to a first communication path via a first terminal,
wherein the receiving unit for receiving data signals is connected to a second communication path via a second terminal,
wherein the master coupling unit separates the control unit from the receiving unit and the transmitter unit in a first operating mode and connects the control unit to the receiving unit and the transmitter unit in a first operating mode and connects the control unit to the receiving unit and the transmitter unit in a second operating mode,
the master unit further comprising a third terminal which may be connected to a third communication path,
wherein the master coupling unit short-circuits the second terminal connected to the receiving unit and the third terminal in the first operating mode and opens the short-circuit of the second and third terminal in the second operating mode.

10. The master unit according to claim 9, comprising a fourth terminal which may be connected to a fourth communication path,
wherein the master coupling unit short circuits as well as the first terminal and the fourth terminal in the first operating mode and opens the short-circuit the first terminal and fourth terminal in the second operating mode.

11. The master unit according to claim 9, which is configured to determine the failure of a transmitting mode of a further master unit in order to switch from the first to the second operating mode.

12. A master unit comprising:
- a transmitter unit for transmitting data signals, which may be connected to a first communication path via a first terminal,
- a receiving unit for receiving data signals, which may be connected to a further communication path via a second terminal,
- a control unit for transmitting data signals,
- a master coupling unit connected between the control unit, and
- a third terminal which may be connected to a third communication path,
- wherein the master coupling unit short-circuits the second terminal connected to the receiving unit and the third terminal in a first operating mode and opens the short-circuit of the second and third terminal in the second operating mode.

13. The master unit according to claim 12, comprising a fourth terminal which may be connected to a fourth communication path,
- wherein the master coupling unit short-circuits the first terminal and the fourth terminal in the first operating mode and opens the short-circuit of the first terminal and fourth terminal in the second operating mode.

14. The master unit according to claim 12, which is configured to determine the failure of a transmitting mode of a further master unit in order to switch from the first to the second operating mode, wherein the master coupling unit separates the control unit from the receiving unit and the transmitter unit in the first operating mode and connects the control unit to the receiving unit and the transmitter unit in the second operating mode.

* * * * *